July 12, 1966 K. STOLL 3,260,376
DEVICE FOR POSITIONING AND CONVEYING WORK PIECES
Filed July 23, 1963 3 Sheets-Sheet 1
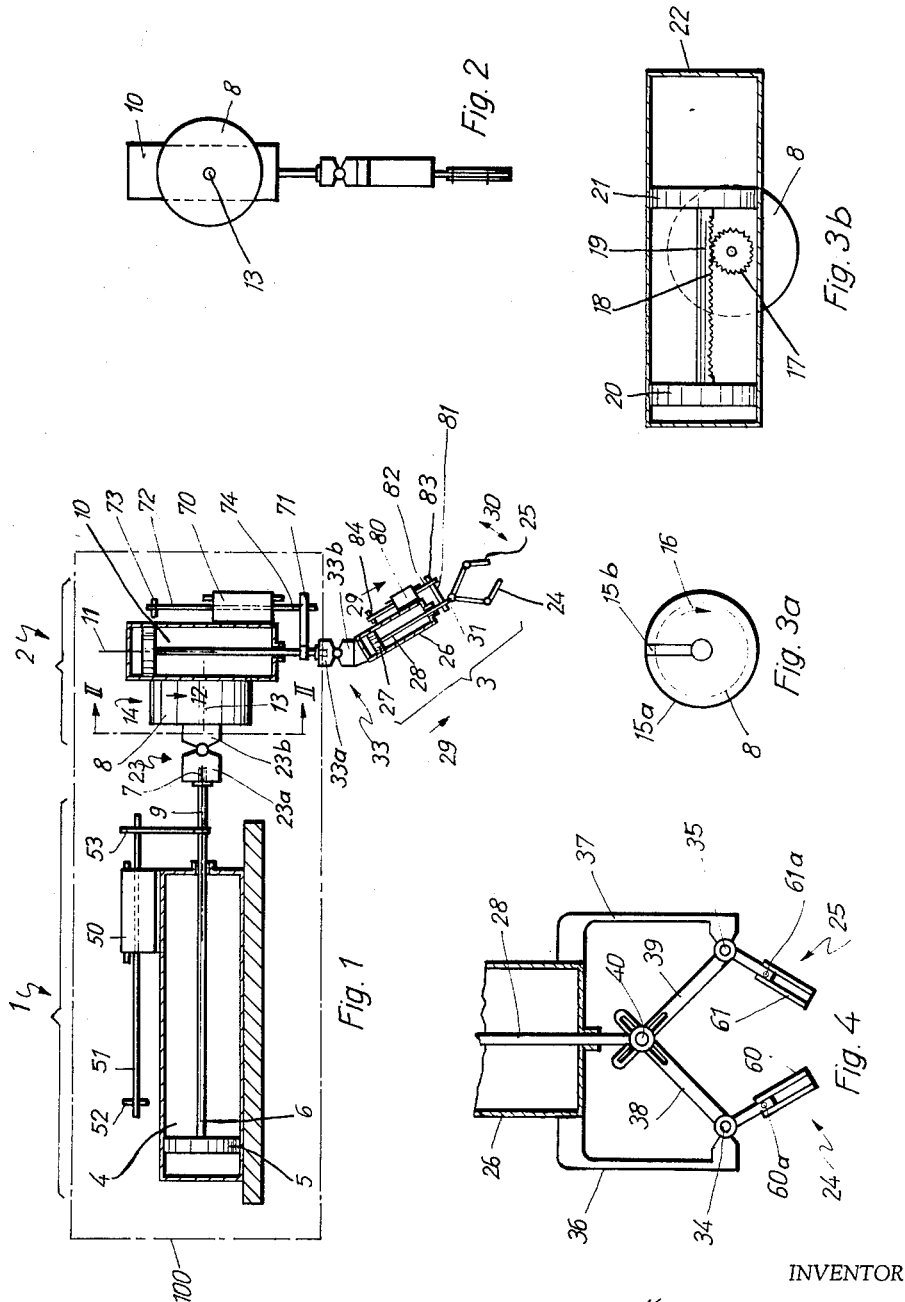
INVENTOR
KURT STOLL
BY Bailey, Stephens & Huetting
ATTORNEYS July 12, 1966 K. STOLL 3,260,376
DEVICE FOR POSITIONING AND CONVEYING WORK PIECES
Filed July 23, 1963 3 Sheets-Sheet 2
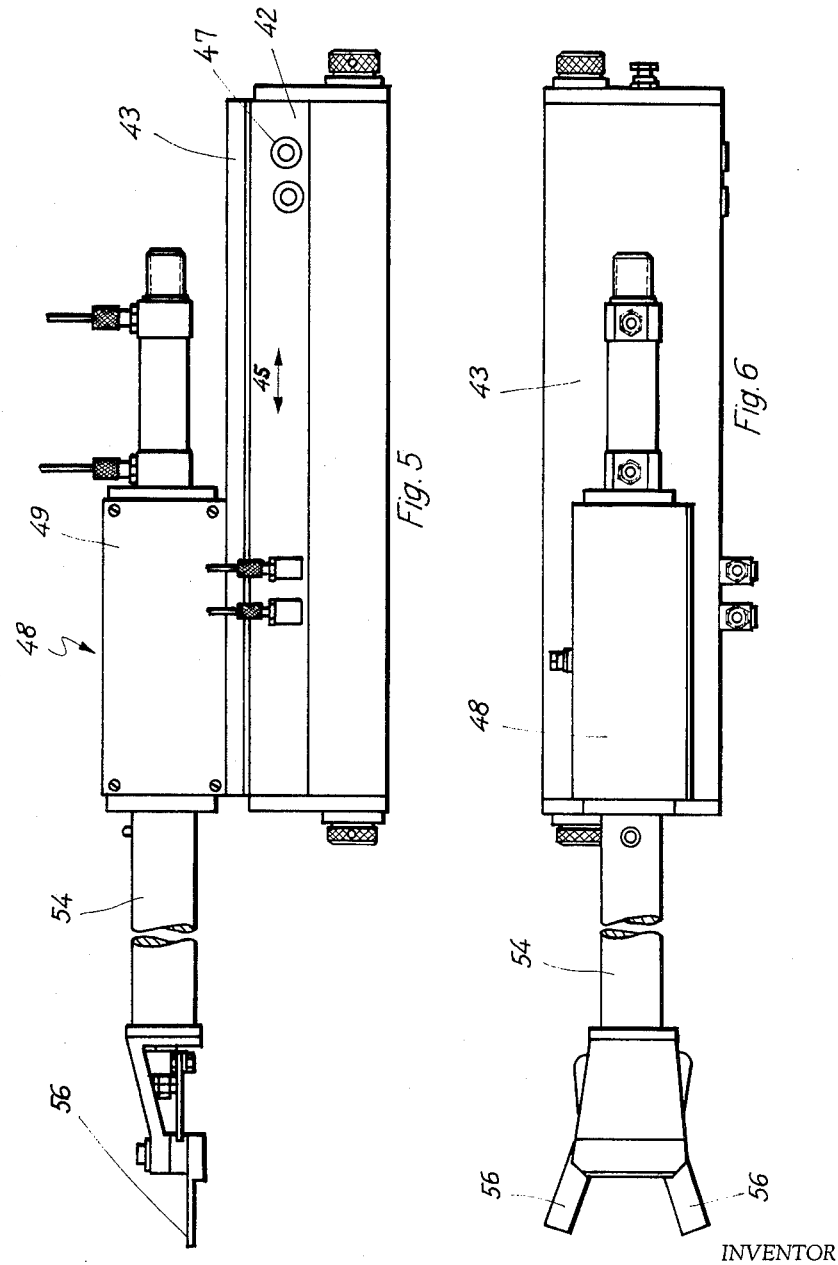
INVENTOR
KURT STOLL
BY Bailey, Stephens & Huettig
ATTORNEYS July 12, 1966    K. STOLL    3,260,376
DEVICE FOR POSITIONING AND CONVEYING WORK PIECES
Filed July 23, 1963    3 Sheets-Sheet 3

INVENTOR
KURT STOLL
BY Bailey, Stephens & Huettig
ATTORNEYS

United States Patent Office 3,260,376
Patented July 12, 1966

3,260,376
DEVICE FOR POSITIONING AND CONVEYING
WORK PIECES
Kurt Stoll, 48 Schanbacherweg, Esslingen-
Hegensberg, Germany
Filed July 23, 1963, Ser. No. 297,136
5 Claims. (Cl. 214—1)

The invention refers to a device for positioning and conveying work pieces which conveys the work pieces to and fro between a working place and a supply or delivery station arranged therebefore or therebehind—in such a way that no stationary guiding surfaces are necessary. The invention refers moreover to devices of the aforesaid kind which—if desired—transfer the work pieces on the work station to the prescribed position which may be, for instance, the optimal position on the work station.

In accordance with the invention the new device serving as a feeding unit includes a feeding mechanism performing an automatically program-controlled straight-line forward and backward feeding motion and carrying during its feeding motion the work pieces to and fro between the area of the work station and the area of the supply or delivery station arranged therebefore or therebehind, eventually an adjusting mechanism for transferring the work pieces from the position corresponding to the final position of the holding member of the feeding mechanism into the prescribed position connected with a holding member of the feeding mechanism and participating in its straight-line feeding movement and effectuating with respect to the holding member of the feeding mechanism an adjusting movement perpendicular or approximately perpendicular to the feeding movement and in synchronism therewith, and a gripping or chucking mechanism operated preferably pneumatically and synchronously with the movement of the mechanisms arranged therebefore and connected with a holding member of the adjusting mechanism or a holding member of the feeding mechanism and thereby participating in its adjusting or feeding movement, said last-named mechanism having chucking elements allotted to one another and acting or cooperating in a jaw- or gripper-like manner for gripping the work pieces and performing alternatively a closing and opening motion. The new device is characterized by its all-around applicability and its extremely wide scope, for it may be easily adjusted to all conditions imaginable whenever smaller parts are to be handled. By means of that device, which imitates, as it were, the operations of a man's hand, the work pieces can be moved into any direction necessary for the working process.

The new device according to the invention can be converted to other working procedures within a very short time, and it has moreover the advantage that the set-up time can be reduced to a minimum. Compared to other devices of that category, the new device can be accommodated in a very small space so that it may be used in high precision industry, for example, on automatic assembling machines, for feeding presses etc.

These and other objects, features, and advantages of the present invention will become further apparent from the following detailed description thereof.

In the drawings there are shown different embodiments of the invention.

FIG. 1 is a schematical sectional side view of a device in accordance with the invention;

FIG. 2 shows the arrangement according to FIG. 1 seen in a view according to the line II—II of FIG. 1;

FIGS. 3a and 3b show two embodiments of a part of the arrangement shown in FIG. 1 schematically and in a vertical section;

FIG. 4 is a detail of the device in accordance with the invention in a side view on a larger scale;

FIG. 5 shows a further modification of the object of the invention in a side view;

FIG. 6 is a plan view of the embodiment according to FIG. 5 and

Figure 7:
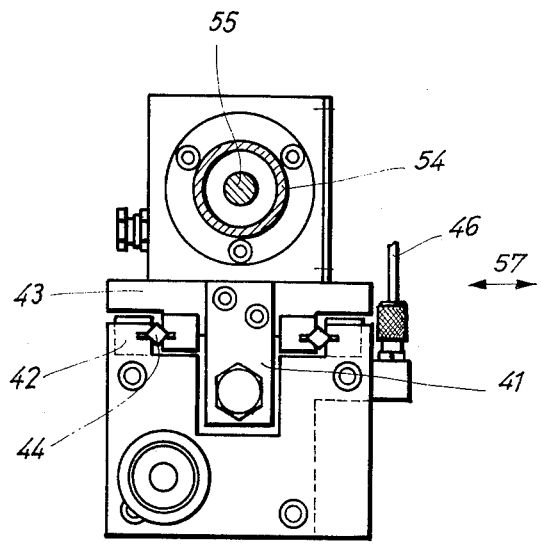
FIG. 7 shows the embodiment according to FIGS. 5 and 6 in a front view.

The device in accordance with the invention and as embodied in FIGS. 1 to 4 consists of three mechanisms, namely a feeding mechanism 1, an adjusting mechanism 2 and a gripping and chucking mechanism 3.

The feeding mechanism consists of a pneumatic cylinder 4 with a piston 5 guided therewithin and carrying a piston rod 6, the free end 7 of which protrudes from the cylinder to serve as a holding member for the following mechanisms. The feeding motion produced by the cylinder follows a straight line in both directions, to and fro, is automatically program-controlled and serves for the conveyance of the work pieces between the area of the working place and the area of the supply and delivery station arranged therebefore and/or therebehind.

The adjusting mechanism arranged behind the feeding mechanism consists of a pneumatically operated rotating cylinder 8 rotating about the longitudinal middle axis 9 of the feeding cylinder, as well as of a pneumatic cylinder 10, the longitudinal axis 11 of which is perpendicular to the longitudinal axis 9 of the feeding cylinder and which performs a straight-line adjusting movement in the direction of the arrow 12 and perpendicular to the feeding movement of the feeding cylinder. The cylinders 8 and 10 form a compact unity so that the direction of straight-line adjusting movement is determined by the rotatory adjusting movement of the cylinder 8. The revolving cylinder 8 is fixedly connected to the working cylinder 10 by bearing with its front face against the peripheral surface of the cylinder 10. The rotational axis 13 of the revolving cylinder is perpendicular to the longitudinal axis 11 of the working cylinder. The adjusting mechanism is connected with the holding member 7 of the feeding mechanism, so that it participates in the straight-line feeding movement thereof. Its function is to transfer the work pieces in synchronism with the feeding motion out of the position corresponding to the end position of the holding member of the feeding mechanism into the prescribed position by performing together with the work pieces secured thereto a displacing movement with respect to the holding member of the feeding mechanism which is perpendicular to the feeding movement according to the arrow 14 and/or 12. If the feeding mechanism is comparable to the arm of a man, the adjusting mechanism is like his wrist. Under certain circumstances the adjusting mechanism may consist of only one of the two cylinders, either 8 or 10.

As for the embodiment of FIG. 3a, the revolving or rotating cylinder of the adjusting mechanism is constructed as an impeller wheel 15a, 15b, turnable in the sense of the arrow 16. As for the embodiment of FIG. 3b, the revolving or rotating cylinder is moved by the toothed wheel 17 which meshes with the toothed portion 18 of the piston rod 19 which is provided with the two piston 20 and 21, and is displaceable within the pneumatic cylinder 22 to and fro. In a further embodiment not shown in the drawings the piston rod rotatable within the allotted cylinder cooperates on its area protruding from the cylinder with a crank guide, with the aid of which is superposed on the rectilinear to and fro movement of the piston rod a rotational movement about the longitudinal axis of the rod. The arrangement is such that a pin projecting on the periphery of the piston rod radially in an outward direction engages into a spiral groove on the inner side of a guide bushing receiving the piston rod and is guided therewithin in the manner of a sliding block.

Between the holding member of the feeding mechanism and the adjusting mechanism there is inserted a ball and socket joint 23, the two halves 23a, 23b of which can be displaced with respect to each other and locked in their respective position.

The gripping and chucking mechanism 3 is in its turn connected with the holding member of the adjusting mechanism, partaking consequently of the adjusting movement of the latter. It has chucking elements that are coordinated in pairs to one another and cooperate like jaws, grippers or pincers for gripping the work pieces and thereby perform alternately a closing and opening movement. To operate the chucking elements 24, 25, there is provided a pneumatic working cylinder 26 with a piston 27 moving therewithin in the sense of the arrow 29 and transversely to the arrow 30 indicating the movement of the chucking elements, and with a piston rod 28 which is connected with the chucking elements. Again there is a ball and socket joint 33 with two halves 33a, 33b which can be moved with respect to each other and locked at any position required, inserted between the cylinder 26 of the gripping and chucking mechanism and the holding member of the adjusting mechanism which is represented by the free end 31 of the piston rod 28 projecting out of the cylinder 10. As demonstrated in FIG. 4 the chucking elements 24, 25 of the gripping and chucking mechanism are constructed like elbow or bell-crank levers so that the obtuse angles enclosed therewithin are opposite to each other. These elbow or knee levers are—each at its knee 34, 35—linked with an element 36, 37 fixedly connected with the working cylinder 26. Their ends 38, 39, corresponding to each other and facing the cylinder 26, are linked at 40 to the piston rod 28 of the cylinder 26. As a result, the chucking elements open when the piston 28 moves forward and close when the piston moves backward.

The gripping force of the chucking elements can be easily and without any loss of time adapted to the thickness of the walls and to the strength of the work pieces by merely changing the pressure within the pneumatic cylinder 26. The ball and socket or globe joints between the different mechanisms allow the elements of the device to be brought into positions desired for the actual working process. The distances to be covered by the movable elements of the different mechanisms, for instance, by the pistons guided within the pneumatic cylinders, can be conveniently suitably regulated and determined without any loss of time by means of adjustable stops or abutments. The movements of the various mechanisms constituting the device are electro-pneumatically controlled by means of punched card programs so that no highly paid specialists are needed to rapidly change the device from one operation to another and the set-up time is reduced to a minimum.

The fingers 60, 61 may be arranged on the chucking elements 24, 25, so as to be rapidly interchangeable, for example, by shoving them sleeve-like over the pins or bolts 60a, 61a and by conveniently securing them thereto, for example, by means of a latching mechanism. Their shape is conveniently adapted to that one of the work pieces to be conveyed.

The reversing valves, by which the pneumatic cylinders are operated and set working, may be directly mounted onto the cylinders as demonstrated in FIG. 1: The reversing valve 50 is fitted to the cylinder 4 and is operated by means of the rod 51 which is connected with the piston rod 6 and moves to and fro theretogether and carries the abutments 52, 53. It is the same with the reversing valve 70 and 80. The valve 70 with the elements 71, 72, 73, 74 is provided on the cylinder 10 and the valve 80 with the elements 81, 82, 83, 84 is provided on the cylinder 26.

The whole device can be arranged in a casing 100 and added, as an apparatus complete in itself, to any device or machine in question. Owing to the great number of the possibilities of regulating and adjusting its different elements, the new device is sure to meet with all the eventualities and emergencies a modern assembly line production may present.

In the embodiment shown in FIGS. 5, 6, and 7 the cylinder 41 of the feeding mechanism is arranged within the housing 42. The piston movable therewithin is connected with the plate or bridge-like closing wall 43 which is displaceable to and fro longitudinally according to the arrow 45 on the side walls of the housing by the medium of the roller guide 44 or a V-guide. 46 is the air supply, the control valves are shown at 47. On the plate there is arranged the gripping and chucking mechanism 48, the adjusting mechanism has been omitted in this case. In the housing 49 of the mechanism 48 there is arranged the cylinder 54 serving to guide the piston rod 55. The gripping and chucking elements are represented at 56. The piston rod performs an axial movement which is converted into the closing and opening movement of the chucking elements. The arrangement may be also such that an adjusting mechanism is provided on the plate 43 which consists in a manner similar to the feeding mechanism of a housing, of a cylinder with a piston received within the said housing, and of a plate fixedly connected to the piston and guided on the said housing, said plate corresponding to the plate 43 but performing a to and fro movement according to arrow 57 and rectangular to the movement of the plate 43. In this case the gripping and adjusting mechanism sits on the bridge-like plate of the adjusting mechanism. With this embodiment the adjusting mechanism performs only a rectilinear adjusting movement perpendicular to the feeding movement and in a horizontal plane.

In a further embodiment, the gripping and chucking elements are pivotable as a unit per se about a horizontal axis extending transversely to the direction of the feeding movement and in a vertical plane. To this end, movements are imparted to the gripping and chucking elements by the working cylinder allotted thereto and via a suitable linkage a height adjusting movement within an angular range of 90 deg. and in a vertical plane.

According to the invention, the individual mechanisms can be assembled selectively in pairs or threes. So, for example, the feeding mechanism can be assembled with the gripping or chucking mechanism only or with the adjusting mechanism and the gripping or chucking mechanism. For this purpose, the working cylinders of the mechanism may be housed each within a casing the upper closing wall of which is guided bridge-like on the other walls of the casing and is connected with the piston guided within the working cylinder, each of said casings being releasably connected, for example, by means of screws, with the bridge-like wall or plate of the mechanism arranged therebeneath.

Although my invention has been illustrated and described with reference to the preferred embodiments thereof I wish to have it understood that it is in no way limited to the details of such embodiments, but is capable of numerous modifications within the scope of the appended claims.

Having thus fully disclosed my invention, what I claim is:

1. In a positioning and conveying device for positioning and conveying work pieces between a working position and a second position spaced therefrom, a hydraulic cylinder having a piston therein with a piston rod extending through one end of the cylinder, a part carried by the piston rod outside the cylinder, means mounting said part on the piston rod for movement and for moving said part in a direction substantially transverse to the longitudinal axis of the piston rod, and pneumatically operated gripping means carried by said part, said piston rod constituting the sole support for said part, means mounting said part on said piston rod for turning movement about the longitudinal axis of the piston rod, and pneumatic means operatively connected to the piston rod and to said last mounting means for producing turning movement of the said part around the longitudinal axis of the piston.

2. In a positioning and conveying device for positioning and conveying work pieces between a working position and a secod position spaced therefrom, a hydraulic cylinder having a piston therein with a piston rod extending through one end of the cylinder, a part, supporting means for said part carried by the piston rod outside the cylinder, said supporting means including a joint adjustable about an axis transverse to the longitudinal axis of the piston rod, means mounting said part on the supporting means for movement and for moving said part in a direction substantially transverse to the longitudinal axis of the piston rod, and pneumatically operated gripping means carried by said part, said piston rod constituting the sole support for said part.

3. In a device as claimed in claim 2, means mounting said part on said supporting means for turning movement about the longitudinal axis of the piston rod.

4. In a positioning and conveying device for positioning and conveying work pieces between a working poistion and a second position spaced therefrom, a hydraulic cylinder having a piston therein with a piston rod extending through one end of the cylinder, a part, supporting means for said part carried by the piston rod outside the cylinder, said supporting means including a joint adjustable about an axis transverse to the longitudinal axis of the piston rod, means mounting said part on the supporting means for movement and for moving said part in a direction substantially transverse to the longitudinal axis of the piston rod, pneumatically operated gripping means and second supporting means including a joint adjustable about an axis transverse to the direction of movement of said part mounting said gripping means on said part, said piston rod consituting the sole support for said part.

5. In a device as claimed in claim 4, means mounting said part on said first supporting means for turning movement about the longitudinal axis of the piston rod.

References Cited by the Examiner
UNITED STATES PATENTS

| | | |
|---|---|---|
| 381,544 | 4/1888 | Garvey. |
| 1,173,326 | 2/1916 | Taylor _____ 93—31 X |
| 1,709,682 | 4/1929 | Moxley _____ 92—138 X |
| 1,836,444 | 12/1931 | Carnahan. |
| 2,668,520 | 2/1954 | Best _____ 91—210 |
| 2,679,940 | 6/1954 | Goertz. |
| 3,043,448 | 7/1962 | Melton. |
| 3,077,993 | 2/1963 | Mulvany _____ 214—1 |
| 3,095,982 | 7/1963 | Weisner. |

MARVIN A. CHAMPION, *Primary Examiner.*

HUGO O. SCHULZ, *Examiner.*